United States Patent
Johnston et al.

(10) Patent No.: US 9,457,521 B2
(45) Date of Patent: Oct. 4, 2016

(54) METHOD, APPARATUS AND MATERIAL MIXTURE FOR DIRECT DIGITAL MANUFACTURING OF FIBER REINFORCED PARTS

(75) Inventors: Scott Robert Johnston, St. Louis, MO (US); Jonathan Blake Vance, St. Louis, MO (US); James William Fonda, Moscow Mills, MO (US); Brett Ian Lyons, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 118 days.

(21) Appl. No.: 13/223,924

(22) Filed: Sep. 1, 2011

(65) Prior Publication Data

US 2013/0056672 A1 Mar. 7, 2013

(51) Int. Cl.
| | |
|---|---|
| B29C 70/88 | (2006.01) |
| B22F 3/105 | (2006.01) |
| B29C 67/00 | (2006.01) |
| C22C 47/02 | (2006.01) |
| C22C 47/04 | (2006.01) |

(52) U.S. Cl.
CPC ............ B29C 70/88 (2013.01); B22F 3/1055 (2013.01); B29C 67/0051 (2013.01); C22C 47/025 (2013.01); C22C 47/04 (2013.01); *Y02P 10/295* (2015.11)

(58) Field of Classification Search
USPC .................................................. 264/429, 440
See application file for complete search history.

(56) References Cited

U.S. PATENT DOCUMENTS

| | | | |
|---|---|---|---|
| 5,053,090 A | 10/1991 | Beaman et al. | |
| 5,545,367 A | 8/1996 | Bae et al. | |
| 5,733,497 A | 3/1998 | McAlea et al. | |
| 6,040,762 A * | 3/2000 | Tompkins | 340/426.24 |
| 6,372,173 B1 | 4/2002 | Peschges | |
| 8,475,703 B2 * | 7/2013 | Turng et al. | 264/437 |
| 2003/0094734 A1 * | 5/2003 | Deckard et al. | 264/425 |
| 2007/0267766 A1 | 11/2007 | Hesse et al. | |
| 2009/0211080 A1 * | 8/2009 | Gowland et al. | 29/602.1 |
| 2010/0152356 A1 | 6/2010 | Cevolini | |
| 2011/0052898 A1 | 3/2011 | Roberts | |
| 2011/0175259 A1 * | 7/2011 | Turng et al. | 264/437 |

FOREIGN PATENT DOCUMENTS

| | | |
|---|---|---|
| DE | 19942071 A1 | 3/2001 |
| EP | 1634693 A1 | 3/2006 |
| JP | S63111039 A | 5/1988 |
| JP | H02108520 A | 4/1990 |
| JP | H07509188 A | 10/1995 |
| JP | 2000033652 A * | 2/2000 |
| WO | WO9320993 A1 | 10/1993 |

(Continued)

OTHER PUBLICATIONS

European Search Report, dated Nov. 20, 2012, regarding Application No. EP12181264.8, 6 pages.

(Continued)

*Primary Examiner* — Ryan Ochylski
(74) *Attorney, Agent, or Firm* — Yee & Associates, P.C.

(57) ABSTRACT

A part is manufactured by introducing magnetic particles into a matrix material, and orienting the particles by coupling them with an electromagnetic field. The matrix material is solidified in patterned layers while the particles remain oriented by the field.

20 Claims, 10 Drawing Sheets

(56) References Cited

FOREIGN PATENT DOCUMENTS

| WO | 9630195 | 10/1996 |
|---|---|---|
| WO | 2005090448 A1 | 9/2005 |
| WO | 2005090449 A1 | 9/2005 |

OTHER PUBLICATIONS

Notice of Reasons for Rejection and English Translation, regarding Japanese Patent Application No. 2012-179461, issued Mar. 29, 2016, 7 pages.

* cited by examiner

METHOD, APPARATUS AND MATERIAL MIXTURE FOR DIRECT DIGITAL MANUFACTURING OF FIBER REINFORCED PARTS

BACKGROUND INFORMATION

1. Field

The present disclosure generally relates to direct digital manufacturing techniques, especially additive methods, and deals more particularly with a method and apparatus for manufacturing fiber reinforced polymeric resin parts, and to a material mixture that may used to build the parts.

2. Background

Direct digital manufacturing (DDM), now referred to as Additive Manufacturing (AM), is a process that creates physical parts directly from a 3D CAD (computer aided design) file using computer controlled additive fabrication techniques. Common additive manufacturing techniques include stereolithography (SLA), fused deposition modeling (FDM), selective laser sintering (SLS) and three dimensional printing (3DP), to name a few. Each of these processes builds a three dimensional solid part, layer-by-layer, by locally fusing or curing building materials that may be in powder or liquid form. For example, the SLA process builds part a layer at a time using a UV laser and a vat of UV-curable liquid photopolymer resin. For each layer, the laser traces a part cross section pattern on the surface of the liquid resin based on a 3D CAD data model of the part. Exposure to the UV laser light cures and solidifies the pattern traced on the resin and adheres it to the layer below. After a pattern has been traced, an elevator platform descends by a single layer thickness, and a resin-filled blade sweeps across the part section, recoating it with fresh material. The process continues layer by layer until the part is complete.

SLS uses a high power laser to fuse small particles of plastic or metal, ceramic or glass powders into a mass that has a desired three dimensional shape. The laser selectively fuses the powdered building material by scanning cross sections generated from a 3D digital description (CAD model) of the part on the surface of a powder bed. After each cross section is scanned, the powder bed is lowered by one layer thickness, a new layer of material is applied on top, and the process is repeated until the part is complete.

The 3DP process uses a slicing algorithm to draw detailed information for each layer of a CAD model of the part. Each layer begins with a thin distribution of powder spread over the surface of a powder bed. Using a technology similar to ink-jet printing, a binder material selectively joins particles where the object is to be formed. A piston that supports the powder bed and the part-in-progress lowers so that the next powder layer can be spread and selectively joined. Following heat treatment, the unbound powder is removed, leaving the fabricated part.

In order to strengthen parts produced by additive manufacturing techniques, reinforcing particles, typically short milled or chopped fibers, have been introduced into the powders or liquid resins used to build the parts. However, the fibers are randomly distributed throughout the powder or resin matrix and have random individual orientations. Consequently, these fiber reinforcements yield a highly anisotropic reinforcement relative to the axis of the machine on which they are built.

Accordingly, there is a need for a method and apparatus for direct digital manufacturing of fiber reinforced parts in which the reinforcing fibers may be selectively oriented to provide isotropic reinforcement and directional strength in the part. There is also a need for a method and apparatus that position and/or align short reinforcing fibers or other particles in building materials used in various additive manufacturing processes.

SUMMARY

According to the disclosed embodiments, a method and apparatus are provided for direct digital manufacturing of fiber reinforced parts which controls the orientation and/or position of fibrous reinforcement materials used in the building materials. The position and/or orientation of short reinforcing fibers is influenced by coupling the fibers with controlled magnetic fields while an energy source selectively solidifies the surrounding matrix material. Fiber orientation is controlled by consideration of the time dimension during the building process along with three Cartesian spatial coordinates and a vector for each volume (aka voxel) for orientation of the fibers. Digital control of the position and/or orientation of the reinforcement fibers results in improved mechanical and/or electrical performance and/or characteristics of parts.

According to one disclosed embodiment, a method is provided of manufacturing a part, comprising providing magnetic particles and introducing the magnetic particles into a matrix material. The method further includes orienting the particles in the matrix material by coupling the particles within an electromagnetic field, and solidifying the matrix material while the particles are oriented. Coupling the particles with an electromagnetic field includes positioning at least one pair of electromagnets adjacent the matrix material, aligning the electromagnets, and using the electromagnets to generate the electromagnetic field. Orienting the particles may include aligning the particles in a desired direction and/or moving the particles to form a part feature within the matrix material. Curing the matrix material may be performed using an energy beam. Providing the particles includes coating elongate synthetic fibers with a magnetic metal and/or forming bundles of synthetic fibers and wrapping or coating each bundle with magnetic metal. The matrix material may comprise a powder and the matrix material may be solidified by sintering the powder.

According to another embodiment, a method is provided of manufacturing a fiber reinforced composite part. The method comprises providing a layer of liquid polymer resin and suspending magnetic reinforcing fibers in the liquid resin. The method further includes generating an electromagnetic field using the electromagnetic field to orient the fibers within the liquid resin, and using an energy beam to cure the liquid resin. The method further comprises moving the energy beam and the electromagnetic field over the layer of liquid resin to orient the fibers and cure the resin in a desired pattern within the liquid resin layer. Using an energy beam to cure the liquid resin may be performed using a computer controlled ultraviolet laser to scan the layer to selectively cure portions of the layer.

According to still another embodiment, a direct digital manufacturing method is provided for producing a part. The method comprises providing a mixture of a matrix material and elongate reinforcing fibers exhibiting magnetic properties and using a digitally controlled energy beam to selectively cure portions of the polymer resin, layer-by-layer, based on a digital definition of the part. The method further comprises using an energy field to align the magnetic fibers at least in the portions being cured by the energy beam. Using the energy field to align the fibers may be performed using electromagnets. The matrix material be a powder and the solidification of the matrix material may be performed by sintering the powder. The matrix material may be a liquid resin and the fibers may be suspended in the liquid resin. The fibers may be chopped or milled fibers that include at least one of aramid, glass and carbon. The resin may be a polyamide powder.

According to a further embodiment, a material mixture is provided for use in an additive manufacturing process to fabricate a part. The mixture comprises a matrix material that may be selectively solidified, and magnetic particles. The magnetic particles may include at least one of aramid, glass, and carbon fibers having a magnetic coating, and the matrix material may be one of a polymeric powder, a photopolymeric liquid, a metal powder, and glassy microspheres. The matrix material is a polymeric powder present in the mixture in an amount between approximately 50% and 90% by weight, and the magnetic particles may include one of chopped fibers having a length between approximately 3 and 6 mm, and milled fibers having a length between approximately 50 and 500 microns. The magnetic particles may include bundles of non-magnetic reinforcing fibers, and a layer of magnetic material around each of the bundles.

According to another embodiment, apparatus is provided for direct digital manufacturing a part. The apparatus comprises a supply of a matrix material containing magnetic particles, an energy beam for selectively solidifying the matrix material layer-by-layer to form the part, electromagnets for orienting the magnetic particles in three dimensional space within the matrix, and a controller for controlling the energy beam and the electromagnets based on a digital definition of the part. The electromagnets are arranged in aligned pairs generating an electromagnetic field coupled with the magnetic particles in the matrix, and the controller synchronizes the operation of the energy beam with orienting of the particles by the electromagnets.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
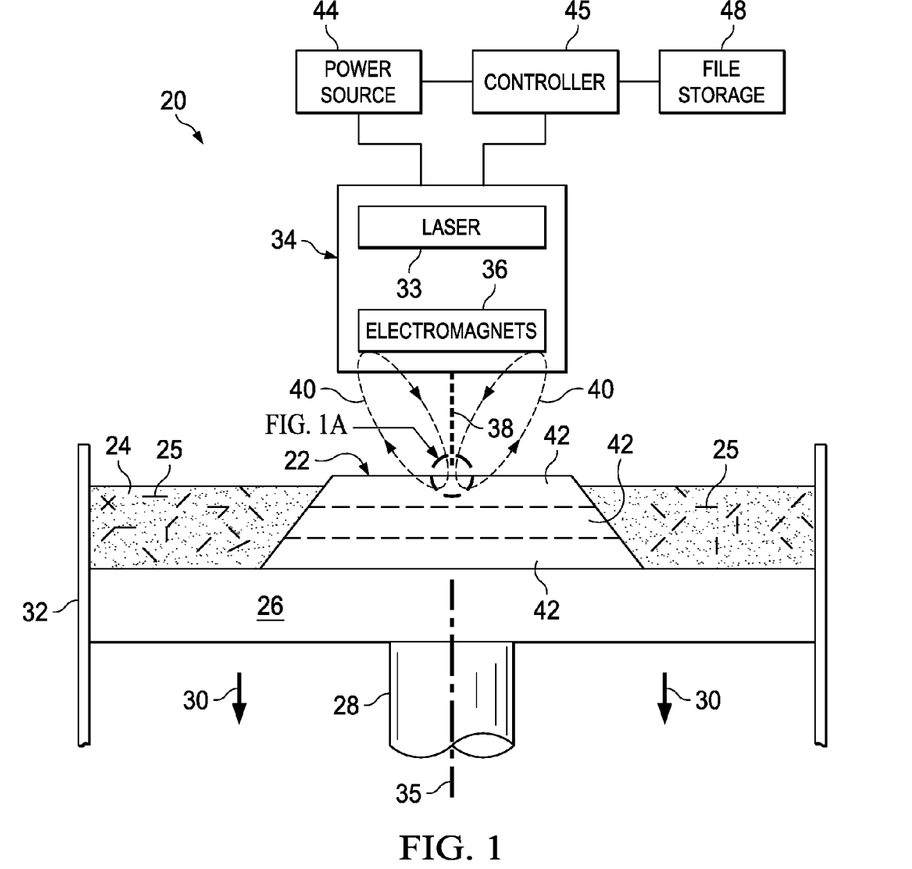
FIG. 1 is an illustration of a combined block and diagrammatic view of apparatus for direct digital manufacturing of a fiber reinforced part using a photopolymer.

Referring first to FIG. 1, apparatus 20 for fabricating a part 22 using a direct digital manufacturing technique broadly comprises a head 34 that moves over a table 26 within a vat 32 containing a suitable building material 24, which in the illustrated example, is a liquid polymer resin. The building material 24, which will hereinafter be referred to as a "matrix" or "matrix material", may comprise any of a variety of curable, bondable or fusible materials, depending on the application and the additive process being used, including but not limited to thermoset plastics such as epoxy or polyester resins, metals such as Al, Ti, Fe, and Ni, ceramics such as Si, $Al_2So_3$, SiC, and thermoplastics such as polyamide, Polyaryletherketone, Polyphenylene sulfide, Polyphthalamide and glassy microspheres, to name only a few.

The table 26 may be raised or lowered 30 within the vat 32 by a piston 28 or other suitable mechanism, along a central machine axis 35. In one embodiment, the matrix material 24 may comprise a photopolymer resin having a viscosity between approximately 100 and 2000 cps, that is selectively solidified in sequential layers 42 using an UV (ultraviolet) laser 33 on the head 34 that directs a UV laser beam 38 onto the liquid resin. Depending on the particular matrix material 24 and additive process being used, other energy beams may be used to cure or fuse the matrix material 24, such as without limitation, an IR (infrared)

beam or an electron beam. Magnetic particles such as, without limitation, chopped or milled reinforcing fibers 25 are mixed into and suspended within the matrix material 24, forming a mixture that may or may not be substantially homogeneous. Magnetic particles other than, or in addition to fibers 25 may be mixed into the matrix material 24 to achieve desired part characteristics. As used herein, "magnetic particles", "magnetic fibers" and "magnetic materials" refer to particles, fibers or other materials that produce a magnetic field in response to an applied magnetic field, and particularly to materials that are ferromagnetic or ferrimagnetic.

The fibers 25 may comprise a magnetic metal or a combination of one or more magnetic metals or metal alloys and non-magnetic materials, such as without limitation, a polymer, glass or a mineral. Suitable metals include without limitation, Fe, Ni, Co, and alloys thereof, to name only a few. The fibers 25 may themselves comprise permanent magnets, and the resulting part 22 may comprise a permanent magnet composite. The aspect ratio (length-to-diameter ratio) of the fibers 25 may be selected to suit the particular application, matrix material 24, electromagnetic field strength and the additive process being used, as well as other variables, such the viscosity of the matrix material. Generally, however, it may be desirable to select fibers having a relatively high aspect ratio in order to minimize the reluctance of the magnetic circuit formed by the fibers 25 and the electromagnetic fields 40. The content of the fiber 25 in the mixture may be in a volume fraction in the range of approximately 20% to 50%. In one example, the fibers 25 may comprise chopped synthetic fibers having a length between approximately 3 mm and 6 mm which are coated with a magnetic metal. In another example, the fibers 25 may be milled fibers having length between 50 microns and 500 microns which are also coated with a magnetic metal. In a further practical embodiment, the matrix material comprises a polymeric powder present in the mixture in amount between approximately 20% and 99% by weight, but preferably between 50% and 90% by weight.

Figure 1A:
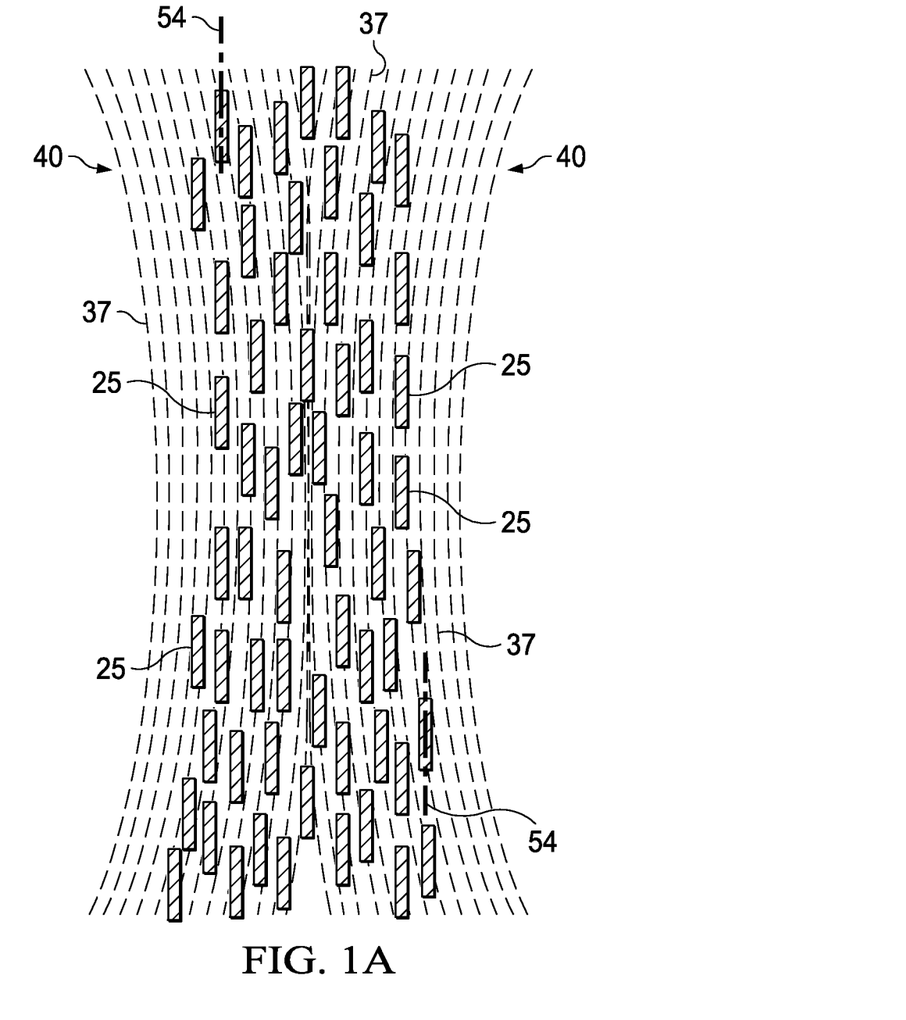
FIG. 1A is an illustration of the area designated as FIG. 1A in FIG. 1, showing the intersection of aligned magnetic fields produced by the apparatus of FIG. 1.

The head 34 further includes one or more pairs of electromagnets 36 that are aligned with each other relative to a machine axis 35 to generate electromagnetic fields 40, which as shown in FIG. 1A, cooperate to orient the magnetic reinforcing fibers 25 in a desired direction in order to stiffen the part 20 along a desired direction, such as for example, generally parallel to the machine axis 35 (FIG. 1). The magnetic fibers 25 align themselves such that their longitudinal axes 54 are aligned with the lines of force 37 of the fields 40 so as to minimize their reluctance. The electromagnetic fields 40 may also be used to position the fibers 25 by moving them to a desired region (not shown) within the matrix 24, as will be discussed later in more detail. The electromagnets 36 control the orientation and/or position of the fibers 24 in three dimensional space and time with respect to the application of the energy used to solidify the matrix material. The laser 33, head 34 and the electromagnets 36 are coupled with a suitable power source 44 and are controlled by a controller 45. The shape and/or orientation of the fields 40 may depend on the position and/or orientation of the electromagnets 36, as well as the type, size and or density of the magnetic fibers 25.

Controller 45 may comprise a programmed computer that accesses a 3D digital definition of the part 22, such as a CAD file, from electronic file storage 48. The controller 45 uses the 3D CAD file to control movement of the head 34, synchronized with the operation of the laser 33 and the electromagnets 36 to orient and/or position the magnetic fibers 25, and to selectively solidify, bond or fuse portions of each layer 42 of the resin 24 to produce the part 22. As each layer 42 of the part 22 is completed, the table 26 is lowered, and the head 34 proceeds to form the next layer 42 of the part 22. While the laser 33 and the electromagnets 36 are movable along with the head 34 in the example shown in FIG. 1, in other embodiments discussed below, they may instead be stationarily mounted.

Figure 2:
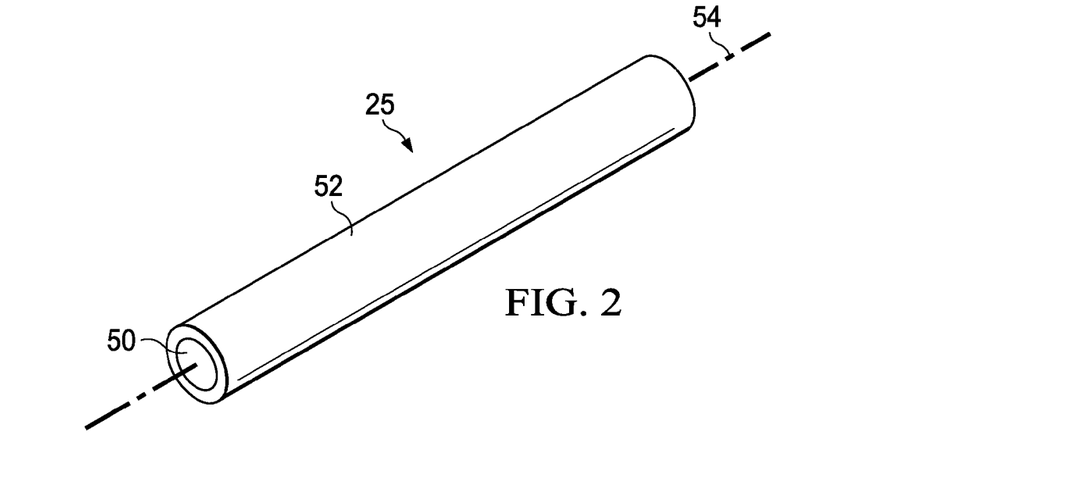
FIG. 2 is an illustration of a perspective view of a magnetic reinforcing fiber.
Figure 3:
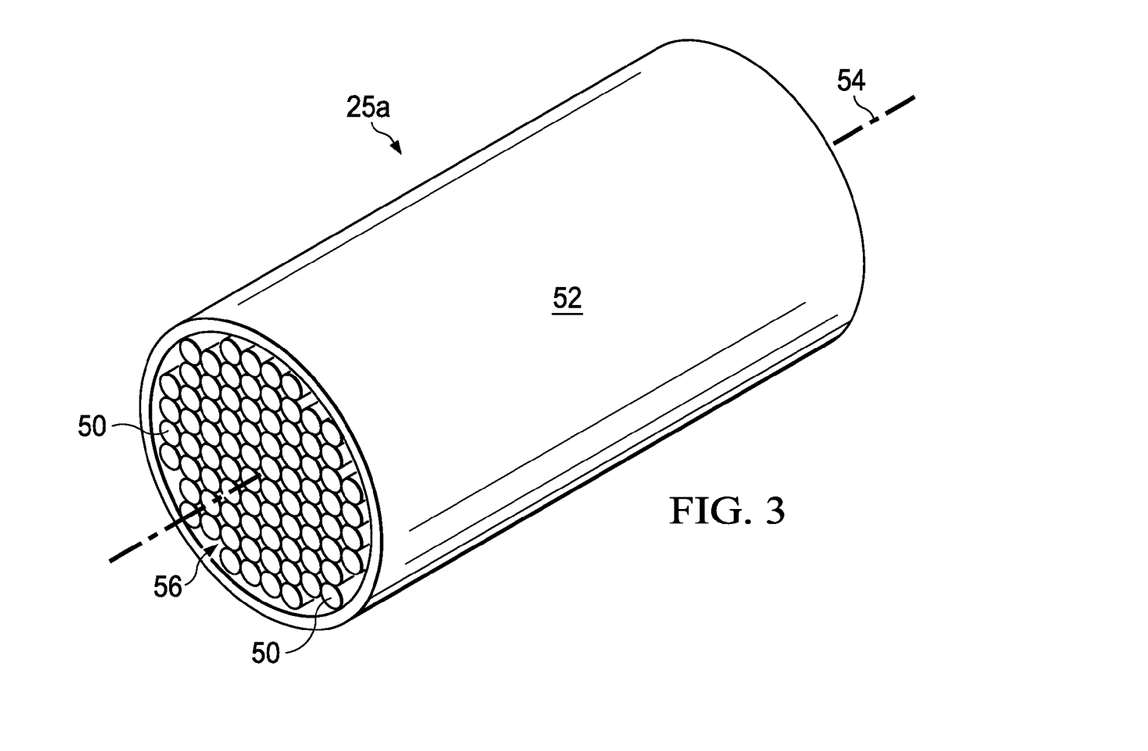
FIG. 3 is an illustration of a perspective view of a bundle of reinforcing fibers surrounded by a magnetic outer cover.

As mentioned above, the fibers 25 may comprise a combination of magnetic and non-magnetic metal materials. For example, referring to FIG. 2, the fibers 25 may comprise a high strength synthetic fiber core 50 such as, without limitation, a carbon fiber, surrounded by a magnetic metal cover or coating 52 which may comprise, without limitation, Ni or a Ni alloy. Other magnetic coatings are possible. FIG. 3 illustrates an alternate form of the magnetic fiber 25a comprising a plurality of individual polymeric fibers 50 arranged in a bundle 56 that is surrounded by a magnetic outer layer 52 of a suitable magnetic metal or metal alloy. As shown FIG. 1A, when coupled with the aligned magnetic fields 40 produced by the electromagnets 36 (FIG. 1), the fields 40 orient the fibers 25, 25a such that their longitudinal axes 54 are aligned substantially parallel to each other and parallel to the lines of force 37 of the fields 40.

Figure 4:
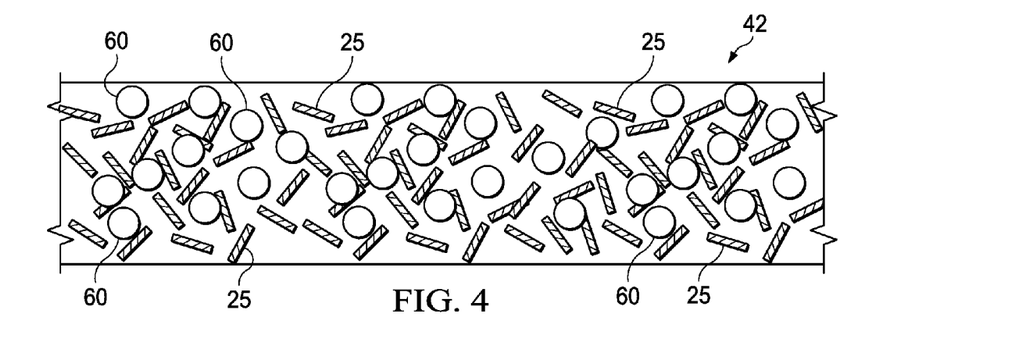
FIG. 4 is an illustration of a layer comprising of a mixture of a dry powder matrix and randomly oriented, magnetic reinforcing fibers.

The disclosed method and apparatus may be used to fabricate fiber reinforced parts in which the matrix material 24 is supplied in powder form, rather than as a liquid resin as shown in FIG. 1. For example, FIG. 4 illustrates a portion of a layer 42 comprising a matrix of dry powder particles or beads 60 in which the magnetic fibers 25 (or other magnetic particles) are mixed either homogeneously or non-homogeneously. The fibers 25 have generally random orientations.

Figure 5:
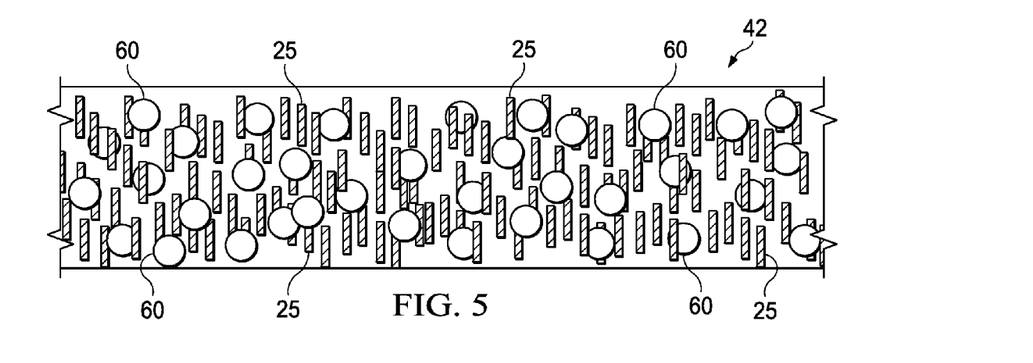
FIG. 5 is an illustration similar to FIG. 4 but showing the fibers having been oriented within the powder matrix in unidirectional alignment by the electromagnetic fields.
Figure 6:
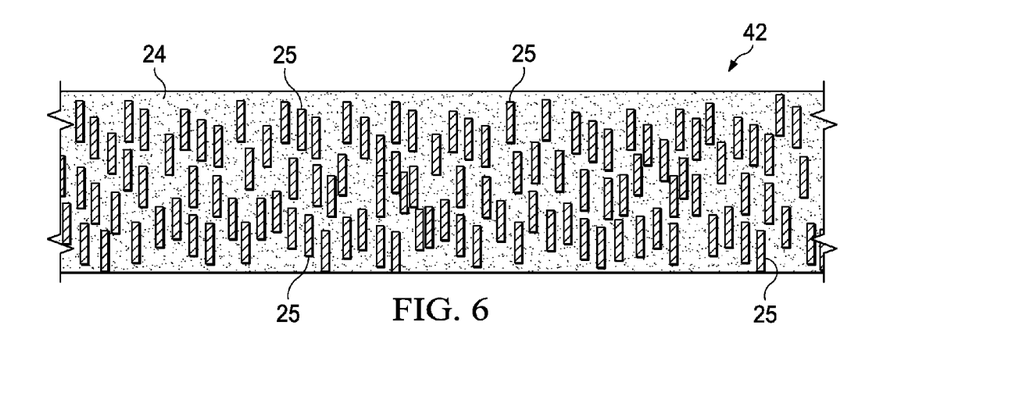
FIG. 6 is an illustration similar to FIG. 5 but showing the powder having been melted and cured, or fused with the fibers remaining oriented.

Referring to FIG. 5, when electromagnetic fields 40 (FIG. 1) are applied to the matrix 24, the fibers 25 orient themselves in unidirectional alignment within the dry powder particles 60. Then, as shown in FIG. 6, the dry powder particles 60 are transformed into a solid matrix 24 surrounding the aligned fibers 25. Depending on the particular additive process being used, this transformation may be achieved by curing, fusing or bonding the matrix material 24. Where the powder particles 60 are a polymer, they may be melted into a liquid using heat, and then cured by an energy beam such as a laser beam 38 (FIG. 1). Where the powder particles 60 are glass, ceramic or a metal or a metal alloy, they may be fused together into a solid by sintering, using an energy beam, such as the laser beam 38 to melt at least the outer layers (not shown) of the particles 60 together. Alternatively, the powder particles 60 may transformed into a solid using a 3D printing process in which the powder particles are selectively bound together by printing a binder (not shown) onto selected areas of a layer 42 of the matrix material 24 that binds the particles 60 together.

It should be noted here that while the fibers 25 may be oriented using magnetic fields 40 before the before the powder particles 60 are transformed into a solid or liquid as described above in connection with FIGS. 4 and 5, it may be possible to orient them during the transformation process. For example and without limitation, wherein the powder particles 60 are a polymer resin, the fibers 25 may be oriented after the powder particles 60 are melted into a liquid, but before the liquid polymer is cured into a solid.

Figure 7:
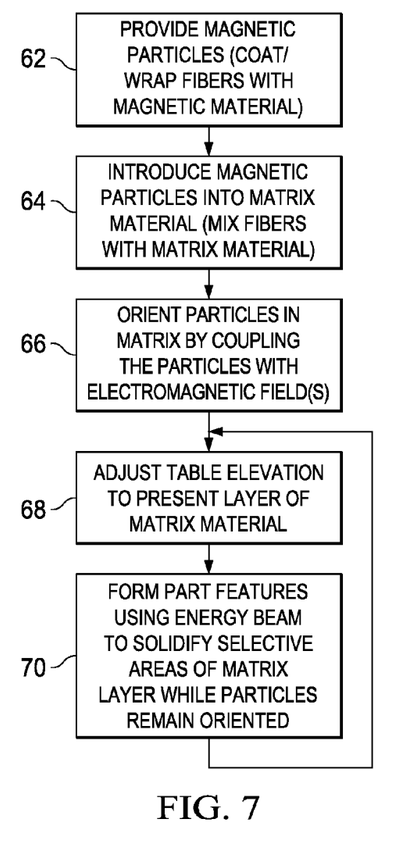
FIG. 7 is an illustration of a flow diagram of a method of direct digital manufacturing of fiber reinforced parts.

Referring now to FIG. 7, a method of direct manufacturing of a part 22 according to the disclosed embodiments begins at step 62 in which magnetic particles are provided, such as magnetic reinforcing fibers 25. As previously discussed, the reinforcing fibers 25 may be fabricated by coating or wrapping one or more non-magnetic fibers with a magnetic material. At step 64, the magnetic particles 25 are introduced into the matrix material, as by mixing magnetic reinforcing fibers 25. In step 66, the magnetic particles in the matrix material may be oriented by coupling one or more electromagnetic fields 40 with the magnetic particles 25. The elevation of a table supporting the part 22 is adjusted at step 68 to present a layer 42 of the matrix material 24 and fibers 25, following which at step 70, features of the part 22 are formed using an energy beam, such as a laser beam, to solidify selected areas of the layer 42 while the magnetic particles remain oriented. Steps 68 and 70 are repeated until all of the layers 42 of the part 22 have been formed. As previously noted, step 66 in which the particles 25 are oriented may be performed substantially simultaneously with step 70.

Figure 8:
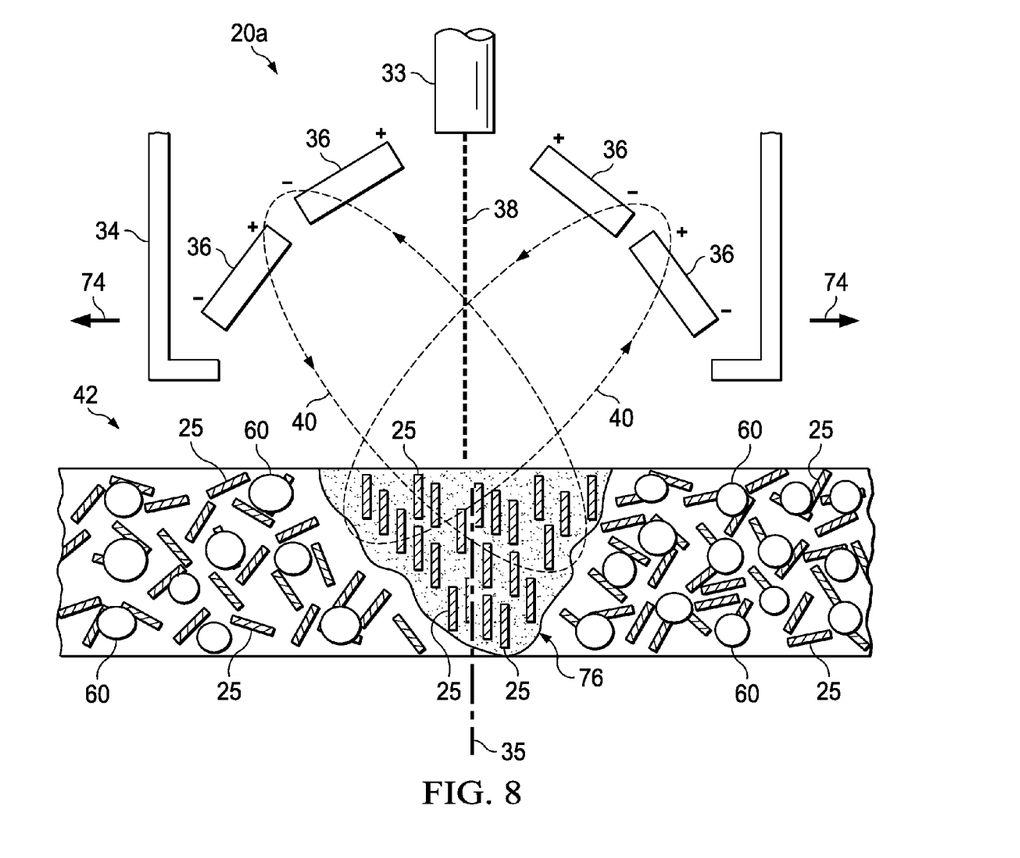
FIG. 8 is an illustration of a side view of one embodiment of the apparatus in relation to a part layer being formed from a mixture of magnetic fibers and dry powder.

FIG. 8 illustrates an alternate embodiment of the apparatus 20a in which a fiber laser 33 along with an array of four electromagnets 36 are mounted on a moveable head 34. The electromagnets 36 are arranged in axially aligned paired arrays such that each pair of electromagnets 36 produces a magnetic field 40 that is coupled with an area 76 of the layer 42 that is being solidified by an energy beam 38 produced by the fiber laser 33. In this example, a layer 58 consisting of dry powder 60 and magnetic particles 25 is being selectively fused. The area shown at 76 is in the process of being melted and fused by a laser beam 38 produced by the fiber laser 33, and the magnetic particles 25 are oriented in unidirectional alignment by the electromagnets 36 as the powder 60 is being melted and fused. The head 34 is moved over the layer 58, controlled by the controller 45 (FIG. 1) based on a digital 3D part definition, such that patterns (not shown) on successive layers 76 of the layer are fused and solidified. Fusing of the powder 24, and thus the rate of travel of the head 34 must be synchronized with the time required to orient or reposition the magnetic particle 25. This timing will depend on a number of variables, including the magnetic field strength and the viscosity of the powder 24 as it is being melted.

Figure 9:
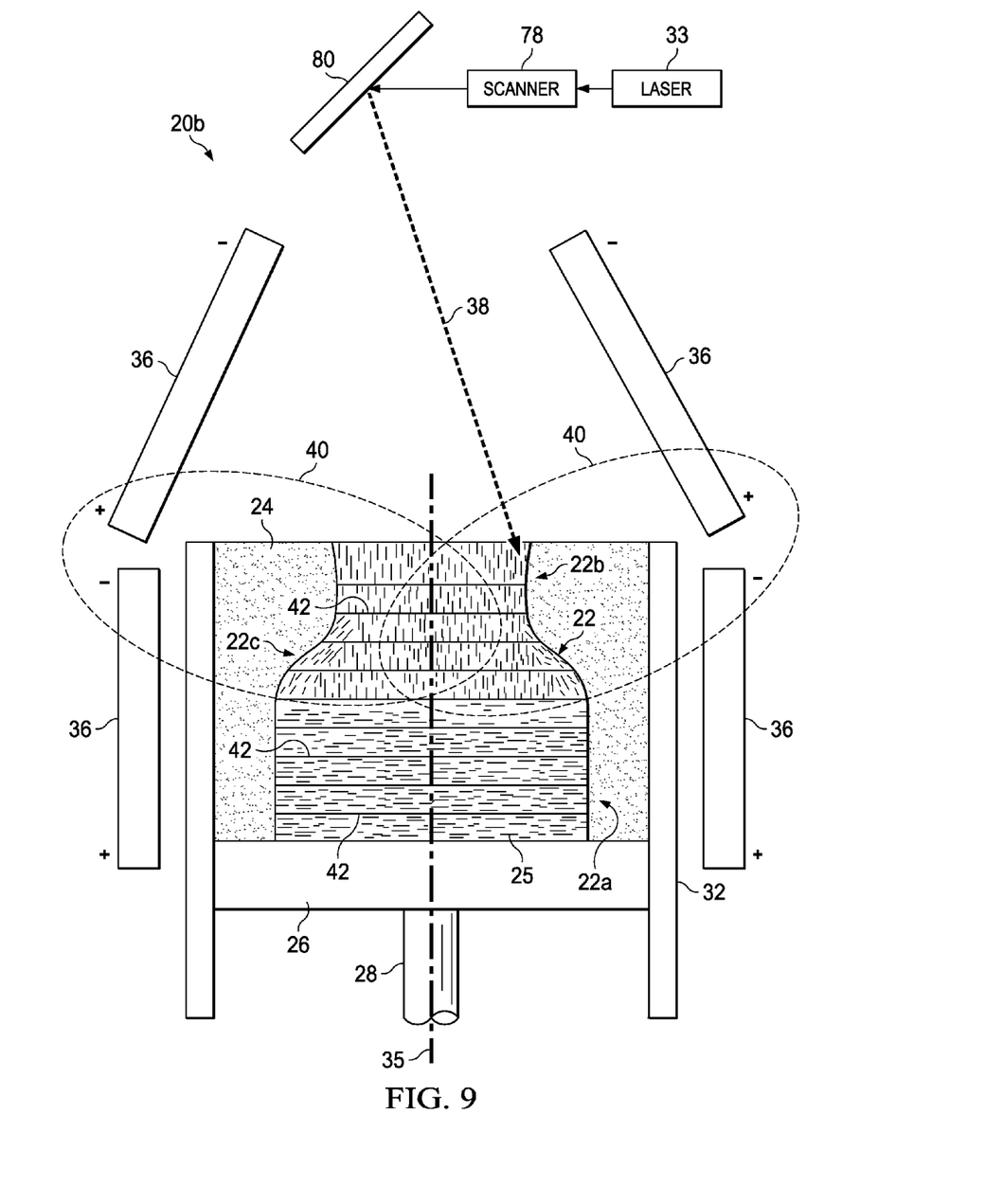
FIG. 9 is an illustration of a combined block and cross sectional view of another embodiment of the apparatus, showing a fiber reinforced part have been fully formed.

FIG. 9 illustrates another embodiment 20b of the apparatus that avoids the need for the moveable head 34 used in the embodiment shown in FIGS. 1 and 8. A laser 33 generates a laser beam 38 that is controlled by a scanner 78 and reflector 80 to scan successive patterns (not shown) on layers 42 of a matrix material which may include magnetic particles 25. In this embodiment, the electromagnets 36 are stationarily mounted around the table 26, and are controlled by the controller 45 (FIG. 1) to produce electromagnetic fields 40 that orient the magnetic particles, here shown as reinforcing fibers 25, as desired. In this example, a part 22 has a generally cylindrical body 82a, and a reduced diameter, generally cylindrical top 82b connected by a tapered neck 82c. As previously discussed, the part 82 is formed layer-by-layer 42 by additive manufacturing using a 3D digital definition of the part 22. The solidified matrix material 24 forming the layers 42 of the body 22 have magnetic reinforcing fibers 25 that are aligned generally normal to the machine axis 35, whereas the magnetic reinforcing fibers 25 in the layers 42 of the top 22b are aligned substantially parallel to the machine axis 35. In the tapered neck 22c of the part 82 at least some of the reinforcing fibers 25 may be aligned to conform to the tapered contour of the neck 82c. Thus, it may be appreciated that strength and/or location of the electromagnetic fields 40 produced by electromagnets 36 may be altered so as to change the orientation and/or position of the magnetic reinforcing fibers 25 as the part 82 is manufactured layer-by-layer 42.

Figure 10:
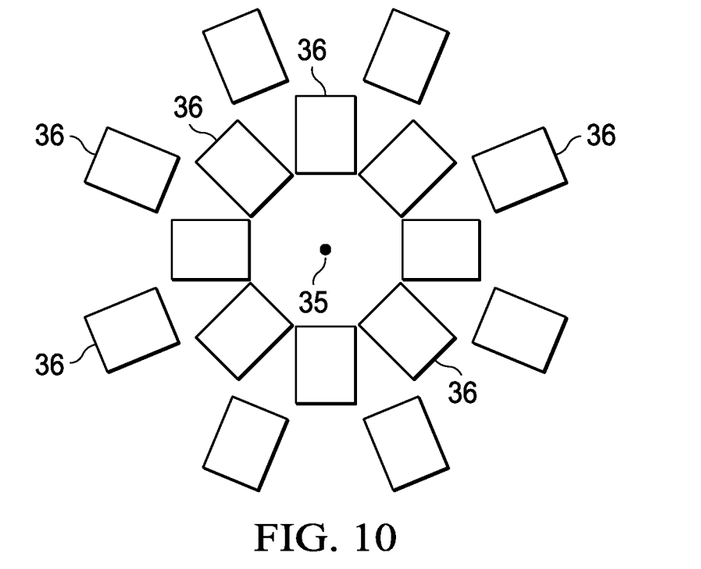
FIG. 10 is an illustration of a plan view of an array of electromagnets that may be used to generate electromagnetic magnetic fields in the embodiments shown in FIGS. 1, 8 and 9.

The number, alignment and layout of the electromagnets 36 may vary with the application. For example and without limitation, FIG. 10 illustrates a two tier circular array of electromagnets 36 around machine axis 35. The array shown in FIG. 10 may provide additional flexibility in forming and altering the location and/or geometry of electromagnetic fields 40 which may allow the magnetic fibers 25 to be oriented at differing angles as each layer of the part is formed.

Figure 11:
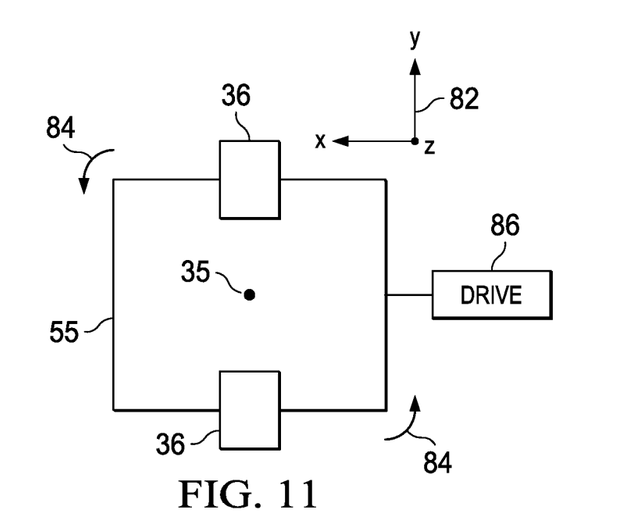
FIG. 11 is an illustration of a top, diagrammatic view of a gantry system for orienting the electromagnets relative to a machine axis.

FIG. 11 illustrates another arrangement that may provide flexibility in forming and altering the location and/or geometry of electromagnetic fields 40. One or more pairs of electromagnets 36 may be mounted on a gantry or other structure 55 that allows the electromagnets 36 to be rotated 34 around the machine axis 35 and/or translated along either of mutually orthogonal x-y axes 82. Altering the position and/or orientation of the electromagnets 36 in this manner may be used to steer the electromagnetic fields 40 and thereby control the orientation and/or position the magnetic fibers 25 within the matrix 24. The alignment and or positioning of the fibers 25 may also be controlled by controlling the strength of the fields 40 produced by the electromagnets 36.

Figure 12:
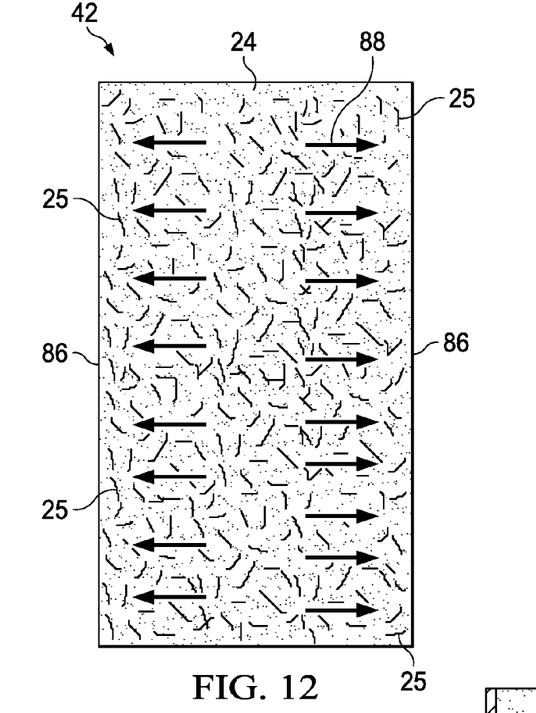
FIG. 12 is an illustration of a layer of liquid resin in which magnetic reinforcing fibers are suspended prior to being subjected to an electromagnetic field.
Figure 13:
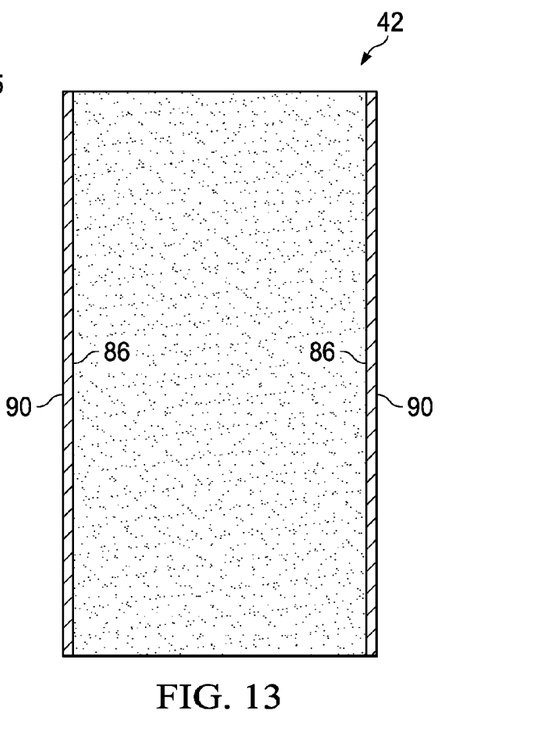
FIG. 13 is an illustration similar to FIG. 12 but after an electromagnetic field is applied, showing the magnetic reinforcing fibers having migrated to the outer boundaries of the part to form a continuous, electrically conductive outer surface on a cured layer.

The electromagnetic fields 40 used to orient magnetic particles, such as magnetic fibers 25, may also be used to form features of a part 22 by altering the position of the fibers 25 in the part 22. For example, FIG. 12 illustrates a layer 42 of matrix material 24 containing magnetic, electrically conductive fibers 25. The electromagnetic force fields 40 (FIG. 1) may be applied to the mixture of the matrix material 24 and the fibers 25 in a manner that causes the fibers 25 to both unidirectionally align, and move 88 to outer boundaries 86 of the layer 42. As shown in FIG. 13, the repositioning of the fibers 25 to the outer boundaries 86 results in an accumulation of the fibers 25 to form a continuous outer metallic layer 90 on the solidified layer 42 which is electrically conductive. Such electrically conductive layers 90 may be useful in a wide range of applications, such as, without limitation, lighting strike protection for aircraft skins (not shown).

Figure 14:
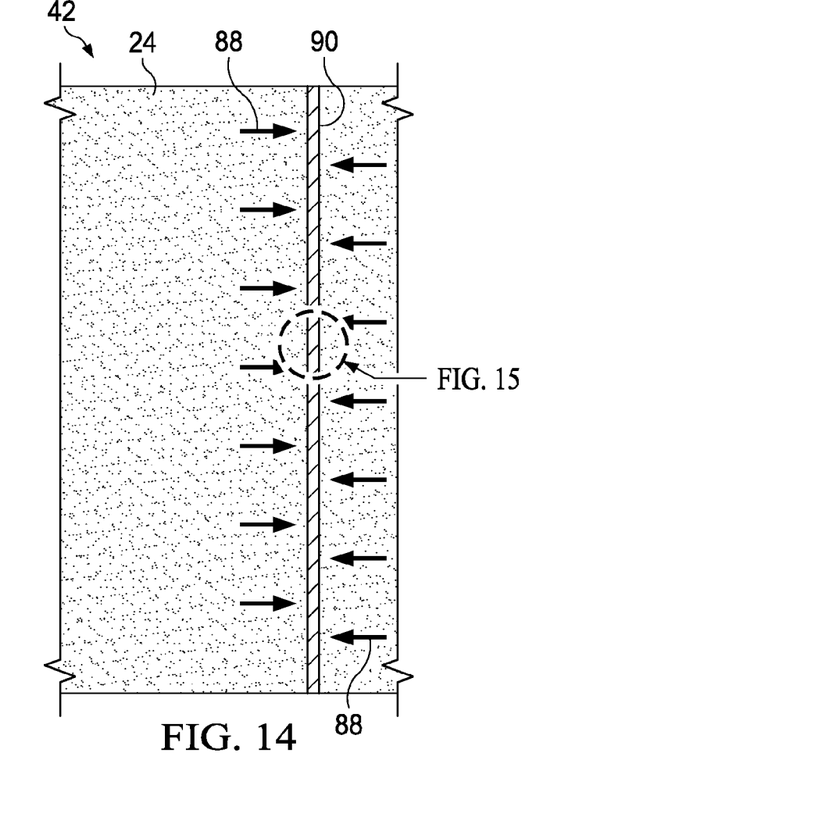
FIG. 14 is an illustration similar to FIG. 13, but showing the fibers having been positioned by an electromagnetic field to form an internal electrical conductor.
Figure 15:
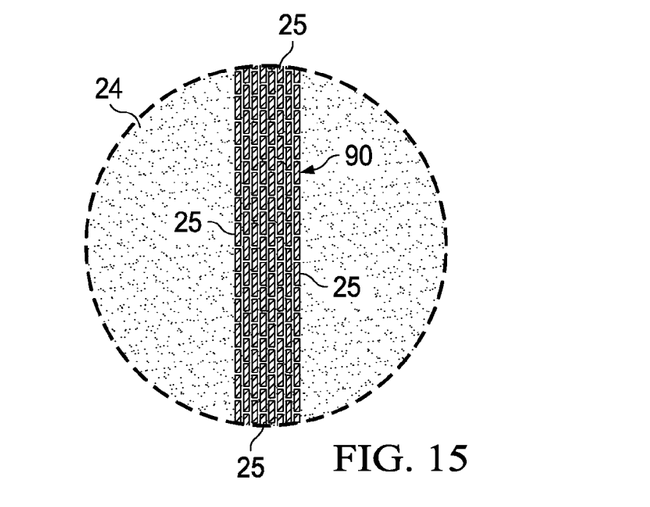
FIG. 15 is an illustration of the area designated as FIG. 15 in FIG. 14, showing the fibers aligned end-to-end to form the conductor.

Attention is now directed to FIG. 14 which illustrates a further example in which electromagnetic fields 40 may be used in additive manufacturing processes to form part features. In this example, a continuous electrical conductor 90 is formed internally within a layer 42 of matrix material 24, using the electromagnetic fields 40 to move 88 the magnetic particles 25, which may be metal fibers 25, within the matrix material 24. As the fibers 25 are repositioned and move together under the influence of the fields 40, they are also oriented into unidirectional alignment. FIG. 15 is an enlarged view of a portion of the conductor shown in FIG. 14. The electromagnetic fields 40 align the fibers 25 end-to-end and position them side-by-side. A slight spacing is shown between the fibers 25 in FIG. 15 to show their relative relationship to each other, however they are actually in end-to-end and side-by-side electrical contact when fully oriented and positioned.

Figure 16:
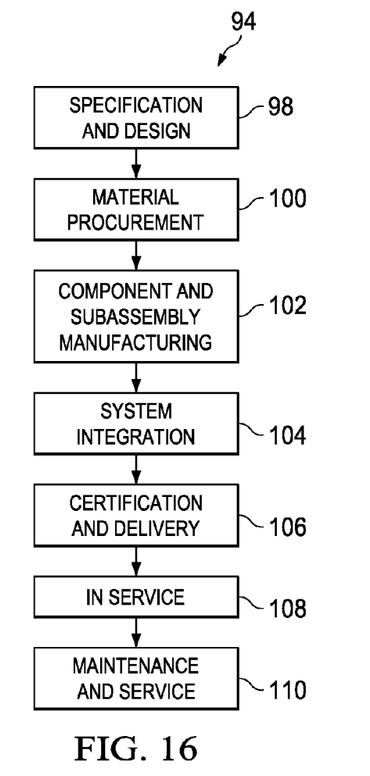
FIG. 16 is an illustration of a flow diagram of aircraft production and service methodology.
Figure 17:
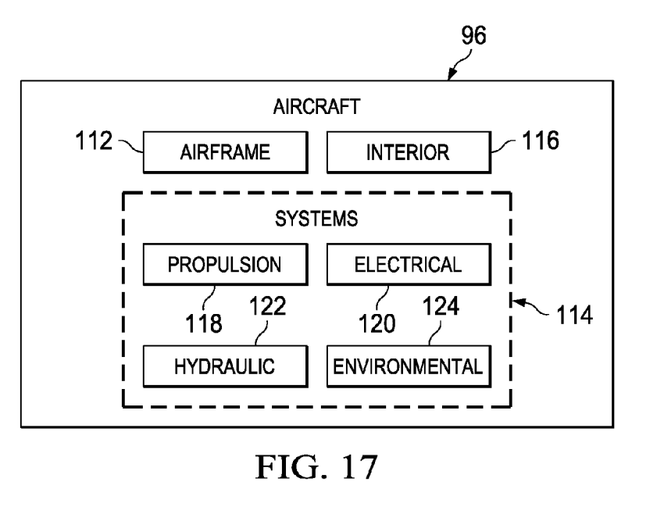
FIG. 17 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 16 and 17, embodiments of the disclosure may be used in the context of an aircraft manufacturing and service method 94 as shown in FIG. 16 and an aircraft 96 as shown in FIG. 17. Aircraft applications of the disclosed embodiments may include, for example, without limitation, hatches, covers, stiffeners, skins and other parts. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110, which may also include modification, reconfiguration, refurbishment, and so on.

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122, and an environmental system 124. Any number of other systems may be included. Although an aerospace example is shown, the principles of the disclosure may be applied to other industries, such as the marine and automotive industries.

Systems and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing a part, comprising:
    introducing magnetic particles into a powder matrix material, the powder matrix material present in an amount between approximately 50% and 90% by weight, the magnetic particles comprising an elongate synthetic fiber core coated with a magnetic material;
    positioning an array of electromagnets proximate the powder matrix material, including aligning the array of electromagnets relative to each other, the array of electromagnets providing an electromagnetic field;
    orienting the magnetic particles in the powder matrix material in a unidirectional alignment by coupling the particles with the electromagnetic field provided by the array of electromagnets;
    altering the electromagnetic field to move the magnetic particles toward a layer of the part; and
    curing the powder matrix material with a directed energy beam while the magnetic particles are oriented.

2. The method of claim 1, further comprising:
    moving a head relative to a vat including the magnetic particles and the matrix material, the array of electromagnets positioned in the head;
    using the array of electromagnets to generate the electromagnetic field and accumulate the magnetic particles on a surface of the part; and
    directing an energy beam from the head to solidify the powder matrix material so as to form the continuous outer metallic layer on the surface of the part, the layer being conductive.

3. The method of claim 2, wherein accumulating the magnetic particles includes aligning the magnetic particles in both an end-to-end and side-by-side continuous alignment along the surface of the part.

4. The method of claim 1, further comprising:
    using the electromagnetic field to form a feature of the part by repositioning the magnetic particles, the feature including a layer of conductive material formed from the magnetic particles.

5. The method of claim 1, wherein each elongate synthetic fiber core further comprises:
    a plurality of aligned synthetic fibers.

6. The method of claim 1, wherein:
    the curing is performed by sintering the powder matrix material.

7. The method of claim 1, wherein the magnetic particles include at least one of aramid, glass, and carbon fibers having a magnetic coating.

8. The method of claim 1, wherein the matrix material is one of:
    a polymeric powder; and
    a metal powder.

9. The method of claim 1, wherein the magnetic particles comprise chopped fibers having a length between approximately 3 and 6 mm.

10. The method of claim 1, wherein the magnetic particles comprise milled fibers having a length between approximately 50 and 500 microns.

11. The method of claim 1, further comprising:
    moving a number of magnetic particles to a surface in the part; and
    forming a conductive layer at the surface.

12. A method of manufacturing a fiber reinforced composite part, comprising:
    suspending magnetic reinforcing fibers in a liquid resin, the magnetic reinforcing fibers comprising a fiber core coated with a magnetic material, the liquid resin present in an amount between approximately 50% and 90% by weight;
    generating an electromagnetic field;
    using the electromagnetic field to orient the fibers within the liquid resin in a unidirectional alignment;
    altering the electromagnetic field to move the magnetic reinforcing fibers to create a layer in the composite part; and moving an energy beam and the electromagnetic field over the liquid resin to cure the resin in a pattern within the layer so as to form a continuous conductive layer of the composite part.

13. The method of claim 12, wherein generating the electromagnetic field is performed using at least two aligned electromagnets positioned in a head, the energy beam also directed from the head.

14. The method of claim 12, wherein the fibers include a substantially non-magnetic material surrounded by a magnetic material, the substantially nonmagnetic material comprising one of aramid, glass, and carbon fibers.

15. The method of claim 12, wherein using an energy beam to cure to the liquid resin is performed using a computer controlled ultraviolet laser to scan the layer and to selectively cure portions of the layer.

16. The method of claim 12, wherein the layer comprises a conductive surface of the part.

17. A direct digital manufacturing method for producing a part, comprising:
   using an energy field to align elongate reinforcing fibers in a matrix material, wherein elongate reinforcing fibers exhibiting magnetic properties and the matrix material are present in an amount between approximately 50% and 90% by weight;
   using the energy field to orient the reinforcing fibers within the liquid resin in a unidirectional alignment;
   altering the energy field to move the reinforcing fibers to create a layer in the composite part;
   moving a digitally controlled energy beam and the energy field over the mixture to cure the matrix material so as to form a continuous conductive layer of the part; and
   using the digitally controlled energy beam to selectively solidify portions of the matrix material, layer-by-layer, based on a digital definition of the part.

18. The method of claim 17, wherein using an energy field to align the fibers is performed using electromagnets positioned on a gantry and configured to rotate.

19. The method of claim 17, wherein:
   the matrix material is a powder, and
   solidifying the matrix material is performed by sintering the powder.

20. The method of claim 17, wherein:
   the matrix material liquid polymer resin, and
   the fibers are suspended in the liquid resin.

* * * * *